United States Patent

Scholz et al.

[11] Patent Number: 6,074,747
[45] Date of Patent: Jun. 13, 2000

[54] INK-IMPRINTABLE RELEASE COATINGS, AND PRESSURE SENSITIVE ADHESIVE CONSTRUCTIONS

[75] Inventors: William F. Scholz, Altadena, Calif.; Christopher D. Meader, University Hts., Ohio; Wen-Chen Su, La Verne; Dong-Tsai Hseih, Arcadia, both of Calif.

[73] Assignee: Avery Dennison Corporation, Pasadena, Calif.

[21] Appl. No.: 08/932,404

[22] Filed: Sep. 17, 1997

Related U.S. Application Data

[63] Continuation-in-part of application No. 08/470,066, Jun. 6, 1995, abandoned.

[51] Int. Cl.[7] .................................................. B32B 7/06
[52] U.S. Cl. ........................ 428/352; 206/411; 283/71; 428/354; 428/355; 428/425.1; 428/447; 428/452; 428/514; 428/537.5; 428/906; 428/914
[58] Field of Search ..................... 428/914, 352, 428/447, 354, 355, 452, 537.5, 906, 41.8, 40.2, 425.1, 514; 283/71; 206/411

[56] References Cited

U.S. PATENT DOCUMENTS

| | | | |
|---|---|---|---|
| 4,002,792 | 1/1977 | Petersen et al. | 428/310 |
| 4,101,698 | 7/1978 | Dunning et al. | 428/31 |
| 4,256,870 | 3/1981 | Eckberg | 528/15 |
| 4,340,647 | 7/1982 | Eckberg | 428/429 |
| 4,340,710 | 7/1982 | Brown, Jr. | 528/15 |
| 4,525,391 | 6/1985 | Eckberg | 427/391 |
| 4,609,574 | 9/1986 | Keryk et al. | 427/407.1 |
| 4,611,042 | 9/1986 | Rivers-Farrell et al. | 528/32 |
| 4,791,163 | 12/1988 | Traver et al. | 524/506 |
| 4,895,747 | 1/1990 | Birkholz et al. | 428/42 |
| 4,952,657 | 8/1990 | Riding et al. | 528/27 |
| 4,959,115 | 9/1990 | Lacy | 156/264 |
| 5,124,423 | 6/1992 | Liebfried | 528/15 |
| 5,165,976 | 11/1992 | Newing et al. | 428/40 |
| 5,177,142 | 1/1993 | Stein et al. | 524/740 |
| 5,183,696 | 2/1993 | Sanderson | 428/194 |
| 5,281,656 | 1/1994 | Thayer et al. | 524/601 |
| 5,356,706 | 10/1994 | Shores | 428/352 |
| 5,387,465 | 2/1995 | Van Vleck | 428/352 |
| 5,461,134 | 10/1995 | Leir et al. | 528/14 |
| 5,496,635 | 3/1996 | Francis et al. | 428/352 |
| 5,658,661 | 8/1997 | Mitchell, Jr. et al. | 428/352 |
| 5,663,227 | 9/1997 | Birkholz et al. | 524/262 |
| 5,874,499 | 2/1999 | Shipston et al. | 525/506 |
| 5,932,352 | 8/1999 | Higgins | 428/423.1 |

FOREIGN PATENT DOCUMENTS

| | | |
|---|---|---|
| 9521206 | 8/1995 | WIPO . |
| 9709388 | 3/1997 | WIPO . |

OTHER PUBLICATIONS

Shores, Hitac Adhesives and Coatings, Inc., "A New Class of Aqueous Release Agents." Calif., pp. 67–73.
SYL–OFF Systems, "Coatings for Premium Performance" 1989, Dow Corning, System IV.
SYL–OFF Systems, "SYL–Off 1171 Paper Coating," 1989, Dow Corning, System IV.
SYL–OFF Systems, "SYL–OFF 1171A Catalyst," 1989, Dow Corning, System IV.
Mayzo, Hitac RA–11, "Water–Based Release Coating," Georgia, 1994.

*Primary Examiner*—Paul Thibodeau
*Assistant Examiner*—D. Lawrence Tarazano
*Attorney, Agent, or Firm*—Renner, Otto, Boisselle & Sklar

[57] ABSTRACT

Ink-imprintable release coating compositions are described which comprise a polymer comprising a polyurethane, a fluoroacrylate polymer or copolymer, or an addition cured or a condensation cured silicone polymer containing dispersed and/or emulsified resin particles, resin particle domains, or both, and, optionally, inorganic particles. The resin particles comprise resins which are different from the polymers and the resins comprise polyurethanes, polyamides, and polyureas. Ink-imprintable label, tape and stamp constructions also are described which comprise a plurality of contiguous labels, tapes or stamps in a roll or stacked sheet configuration without an independent release liner wherein the labels, tapes and stamps have a pressure-sensitive adhesive on the back surface and a cured ink-imprintable release coating on the face surface.

41 Claims, 1 Drawing Sheet

INK-IMPRINTABLE RELEASE COATINGS, AND PRESSURE SENSITIVE ADHESIVE CONSTRUCTIONS

CROSS REFERENCE TO RELATED APPLICATION

This application is a continuation-in-part of application Ser. No. 08/470,066 filed on Jun. 6, 1995 now abandoned.

FIELD OF THE INVENTION

This invention is directed to ink-imprintable or ink-receptive release coating compositions, and pressure sensitive adhesive constructions such as labels, tapes and ink-cancelable self-adhesive postage stamps.

BACKGROUND OF THE INVENTION

Pressure-sensitive adhesive constructions made without a separate release liner are comprised of a two sided substrate with an adhesive on one side and a release material on the other. These are commonly referred to as self-wound products in the industry. The substrate can be made from paper, plastic, metal, cloth, combinations of these materials and other materials. The pressure-sensitive adhesive layer is inherently tacky at room temperature and can bond with other surfaces with light hand pressure. Both permanent and removable adhesives can be used depending on the intended application for the product. For removable adhesives primers can additionally be used to increase the anchorage between the adhesive and the two sided substrate. Release agents are usually applied to the opposite side of the substrate to enable ready unwinding of the self-wound construction. Some low surface energy substrates are inherently releasable but most require the use of a release agent. If the release agent is not used, the adhesive will bond to the backside of the substrate and prevent the roll from unwinding. The force required to unwind the roll is dependent on the specific surface characteristics and chemical compatibility of the adhesive with the release agent.

The postage stamp is a rather complex device. To meet current user demands it must be constructed of a face material or backing capable of accepting high quality printing of complex design. The stamp must also be stable under a variety of environmental conditions and provide an ink-cancelable surface on which the cancellation ink dries rapidly. It is also desired that the stamp can be separated from its adhesive to meet the needs of stamp collectors. In addition to being cancelable, the stamp should have means to detect the stamp so that a properly stamped envelope can be cancelled in an automated cancellation machine. The means to detect the stamp may be either in the ink cancelable surface or in the paper used to prepare the stamp prior to printing.

Traditionally, postage stamps have been manufactured with a water-soluble, water-activated adhesive. It has been the desire of the postal service to not only convert the adhesive to a self-adhesive or pressure-sensitive adhesive, but to also present such postage stamps in traditional and new formats. One new format provides self-adhesive stamps which are dispensable from an automatic teller machine. An old format provides stamps which are dispensable from a self-wound tape or roll.

A self-wound construction comprises a tape which, in the case of stamps, provides a plurality of contiguous stamps marked at regular intervals along the length thereof to indicate where a die-cut is to be made to separate the stamps or with a perforation die-cut between each stamp. The back surface of the stamps is coated with a layer of pressure-sensitive adhesive. The opposed or face surfaces of the stamps must provide an ink-cancelable surface. When the stamps are wound on themselves to form a roll, the pressure-sensitive adhesive comes into contact with the face surface of another stamp. The adhesive adheres to the face, and it is then difficult to impossible to unwind the roll without damage to the face or printed surface. It is possible to reduce the adhesion of the pressure-sensitive adhesive to the face surface of the stamp constructions by applying a release coating to the face surface of the stamps which is capable of reducing the strength of adhesive bond between the pressure-sensitive adhesive and the face of the stamp construction when in the form of a self-wound tape or roll.

U.S. Pat. No. 5,165,976 describes a substrate which is provided with a release surface by application of an emulsion of a vinyl-addition silicone system, catalyst therefore, and a particulate component which may be inorganic or organic in nature but which is preferably a resin. The vinyl-addition silicone system is cured by application of heat and removal of water. The products are useful for many release applications, especially pressure-sensitive adhesive roll stock, and can be converted at high speeds.

U.S. Pat. No. 5,356,706 describes a modified silicone copolymer useful as a release agent. The modified silicone is the reaction product of a di-omegaorgano functional dimethylsiloxane oligomer having terminal active hydrogen groups, a carboxyl group bearing monomer, and a diisocyanate. The copolymer is reported to provide good release properties from tacky adhesive masses.

The present invention is directed to providing ink-imprintable release coating compositions and an ink-cancelable release surface for application to the face side of pressure-sensitive adhesive stamp constructions.

SUMMARY OF THE INVENTION

Ink-imprintable release coating compositions are described which comprise a polymer selected from polyurethane, a fluoroacrylate polymer or copolymer, or a curable silicone polymer containing dispersed and/or emulsified resin particles, resin particle domains, or both, and, optionally, inorganic particles. The resin of the resin particles is different from the polymer and the resins preferably are selected from polyurethanes, polyamides and polyureas. Pressure-sensitive constructions such as tapes, labels and postage stamps also are described. Ink-imprintable stamp constructions are described which comprise a plurality of contiguous stamps in a roll or stacked sheet configuration without an independent release liner wherein the stamps have a pressure-sensitive adhesive on the back surface of the stamps and an ink-imprintable release coating on the face surface of the stamps.

DETAILED DESCRIPTION OF THE INVENTION

Figure 1:
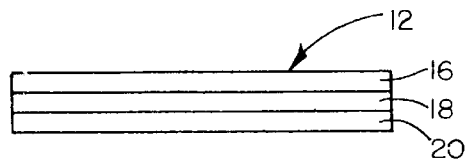
FIG. 1 is a fragmentary schematic cross-sectional view of a stamp construction of the invention.

In one embodiment, the ink-imprintable release coating compositions of the present invention comprise an emulsified curable polymer release material containing resin particles, resin particle domains, or both, and, optionally, inorganic particles. The curable polymeric release materials may include materials such as addition curable silicone polymers, condensation curable silicone polymers, etc. Emulsified polyurethanes and perfluoroalkyl acrylate polymers and copolymers may also be used as release coating compositions in this invention. When resin particles are included, the cured release coatings generally will comprise from about 2% to about 90% by weight of the polymeric release material and from about 10% to about 98% by weight of the resin particles. When inorganic particles are also present in the cured release coatings, the compositions generally will comprise from about 2% to about 90% by weight of the polymer component, from about 5% to about 93% by weight of the resin particles, and from about 5% to about 50% by weight of the inorganic particles.

The ink-imprintable release coating compositions of one preferred embodiment of the present invention comprise an addition curable or condensation curable silicone polymer component containing dispersed and/or emulsified resin particles, resin particle domains, or both, and, optionally, inorganic particles. In one embodiment, the ink-imprintable release coatings may comprise from about 2% to about 90% by weight of the silicone polymer component and from about 10% to about 98% by weight of the resin particles. When inorganic particles are also present in the release coatings, the compositions generally will comprise from about 2% to about 90% by weight of the silicone polymer component, from about 5% to about 93% by weight of the resin particles, and from about 5% to about 50% by weight of the inorganic particles.

The silicone polymer component utilized in the release coating compositions in the present invention may be a condensation curable silicone polymer or an addition curable silicone polymer. The term "addition curable silicone polymer component" as used in the present application, refers to those silicone polymers obtained by reacting a silicone containing at least one vinyl unsaturation group ($\equiv$Si—(R$^1$)$_a$—C(H)=CH$_2$), wherein R$^1$ is a hydrocarbylene group and a is 0 or 1 with a compound containing at least two hydrosilane groups (—Si—H) in the presence of a catalyst (e.g., a Group VIII metal catalyst), preferably a platinum catalyst. These products can be made in emulsion form. Generally, an emulsion of the reactive components is prepared, and the cured polymer is formed by heating the mixture of components once the emulsion is applied to a substrate, usually a web.

The addition curable silicone polymers which contain at least one vinyl unsaturation group are generally referred to in the art as vinyl silicones. In one embodiment, the addition curable silicone polymers may contain two silicon-bonded alkenyl groups per molecule and these polymers may be represented by the formula

$$XR_2SiO(R_2SiO)_aSiR_2X \qquad (I)$$

wherein R denotes a monovalent hydrocarbon or halohydrocarbon group free of aliphatic unsaturation and having from 1 to about 20 carbon atoms, at least 50% of the R groups being methyl, X denotes an olefinic hydrocarbon group having from 2 to about 20 carbon atoms, and a has an average value of 1 to about 1000. The value of the subscript a in Formula I is such that the polydiorganosiloxane has a viscosity at 25° C. of at least 25 centipoise. The types of the X and R groups determine the viscosity value of the siloxane.

The monovalent hydrocarbon groups (R) include alkyl groups, such as methyl, ethyl, propyl, butyl, hexyl, and octyl; cycloaliphatic groups such as cyclohexyl; aryl groups such as phenyl, tolyl, and xylyl; arylalkyl groups such as benzyl and phenylethyl. Preferred monovalent hydrocarbon groups are methyl and phenyl. Monovalent halohydrocarbon groups free of aliphatic unsaturation include any monovalent hydrocarbon group noted above which is free of aliphatic unsaturation and has at least one of its hydrogen atoms replaced with a halogen such as fluorine, chlorine or bromine. Preferred monovalent halohydrocarbon groups have the formula C$^n$X$_{2n+1}$CH$_2$CH$_2$— wherein X is a halogen atom and the subscript n has a value of from 1 to about 10 such as, for example, fluorohydrocarbons represented by CF$_3$CH$_2$CH$_2$— and C$_4$F$_9$CH$_2$CH$_2$—. Several of the R groups can be identical or different as desired, and preferably at least 50% of all of the R groups are methyl.

The alkenyl groups which may be present in the siloxane of Formula I may contain from 2 to about 20 carbon atoms, and the alkenyl groups are preferably selected from the group consisting of the vinyl group and the higher alkenyl groups represented by the formula —R(CH$_2$)$_m$CH=CH$_2$ wherein R denotes —(CH$_2$)$_n$ or —(CH$_2$)$_p$CH=CH— and m has a value of 1, 2 or 3, n has a value of 3 or 6 and p has the value of 3, 4 or 5. The higher alkenyl groups represented by the formula —R(CH$_2$)$_m$CH=CH$_2$ contain at least 6 carbon atoms. For example, when R denotes —(CH$_2$)$_n$—, the higher alkenyl groups include 5-hexenyl, 6-heptenyl, 7-octenyl, 8-nonenyl, 9-decenyl, and 10-undecenyl. When R denotes —(CH$_2$)$_p$CH=CH—, the higher alkenyl groups include, among other, 4,7-octadienyl, 5,8-nonadienyl, 5,9-decadienyl, 6,11-dodecadienyl and 4,8-nonadienyl. Alkenyl groups selected from the group consisting of 5-hexenyl, 7-octenyl, 9-decenyl and 5,9-decadienyl are preferred. It is more preferred that R denotes —(CH$_2$)$_n$— whereby the groups contain only terminal unsaturation and the most preferred groups are the vinyl group and the 5-hexenyl group.

Some specific examples of polydiorganosiloxanes representative of Formula (I) include ViMe$_2$SiO(Me$_2$SiO)

$_x$SiMe$_2$Vi; HexMe$_2$SiO (Me$_2$SiO)$_x$SiMe$_2$Hex; PhMeViSiO (Me$_2$SiO)$_x$SiPhMeVi; ViMe$_2$SiO(Me$_2$SiO)$_{145-300}$SiMe$_2$Vi; etc., wherein Me, Vi, Hex and Ph denote methyl, vinyl, 5-hexenyl and phenyl, respectively, and x is an integer from 1 to 1000. Further examples of such siloxanes may be found in U.S. Pat. No. 5,281,656 which is hereby incorporated by reference.

Siloxane polymers containing at least three silicon-bonded alkenyl groups per molecule are also useful and such polysiloxanes can be represented by the general formula $$YR^1_2SiO(R^1_2SiO)_b(R^1YSiO)_cSiR^1_2Y \tag{II}$$

wherein $R^1$ denotes a monovalent hydrocarbon or halohydrocarbon group free of aliphatic unsaturation and containing from 1 to about 20 carbon atoms, at least 50% of the $R^1$ groups being methyl, Y denotes an alkenyl group containing from 2 to about 20 carbon atoms, b has an average value of from 1 to about 500, and c has an average value of from 1 to about 100. The monovalent groups in the polysiloxane Formula II include the monovalent hydrocarbon and halohydrocarbon groups free of aliphatic unsaturation as described above with regard to Formula I, including the preferred examples. The alkenyl groups in the siloxane of Formula II include alkenyl groups as delineated above with regard to Formula I, including the preferred examples. The value of the subscript b and c in Formula II are such that the siloxane polymer has a viscosity at 25° C. of at least 25 centipoise. The exact value of the b and c that is needed to provide a viscosity value of meeting this minimum limit depends on the identity of the $R^1$ and the Y groups. In one embodiment, b has a value of from 10 to about 200, and c has a value of from 1 to about 10.

Specific examples of the siloxane polymers of Formula II include HexMe$_2$SiO(Me$_2$SiO)$_{150}$(MeHexSiO)$_4$SiMe$_2$Hex; ViMe$_2$SiO(Me$_2$SiO)$_b$(MeViSiO)$_c$—SiMe$_2$Vi; HexMe$_2$SiO(Me$_2$SiO)$_{196}$(MeHexSiO)$_4$SiMe$_2$Hex; HexMe$_2$SiO(Me$_2$—SiO)$_{98}$(MeHexSiO)$_2$SiMe$_2$Hex; and ViMe$_2$SiO(Me$_2$SiO)$_{96}$(MeViSiO)$_2$SiMe$_2$Vi; wherein Me, Vi and Hex denote methyl, vinyl and 5-hexenyl. Silicone polymers of the types represented by Formulae (I) and (II) are described in more detail in U.S. Pat. No. 4,609,574, and the disclosure of this patent is incorporated herein by reference.

Vinyl silicones useful in the present invention also may be of the types disclosed in U.S. Pat. Nos. 4,256,870 and 4,340,647, the disclosures of which are hereby incorporated by reference. These vinyl silicones comprise structural units of the formulae

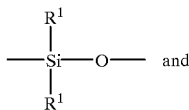  (III)

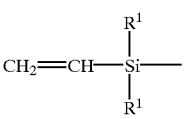  (IV)

wherein each $R^1$ is independently a monovalent hydrocarbon group free from unsaturation and $R^2$ is a hydrocarbon group having alkenyl unsaturation, ordinarily in combination with end groups having the formula

  (V)

The $R^1$ groups are typically alkyl groups such as methyl, ethyl, propyl or butyl with methyl frequently being preferred. The $R^2$ groups are most often vinyl, but may be alkenyl groups containing up to about 18 carbon atoms and a terminal vinyl group. Typically, the $R^2$ groups may be vinyl, allyl, butenyl, hexenyl, cyclohexenyl, octenyl, etc. The amount of alkenyl functional groups ($R^2$) in the vinyl silicone is up to about 20% by weight, and the viscosity of such vinyl silicone at 25° C. is in the range of from about 50 to about 100,000 centipoise.

The vinyl silicone polymers may be cured by the presence of a crosslinking amount of a siloxane crosslinking agent having a substantial proportion, typically from about 10% to about 100% based on silicon atoms, of Si—H groups. Such compounds include polymeric compounds such as trimethyl silyl-terminated polymethylhydrogensiloxane. The viscosity of the crosslinking agents at 25° C. is up to about 1000 centipoise and preferably in the range of from about 25 to about 1000 centipoise.

Presently preferred addition curable silicone compositions comprise mixtures of (a) reactive vinyl silicone polymers of the formula:

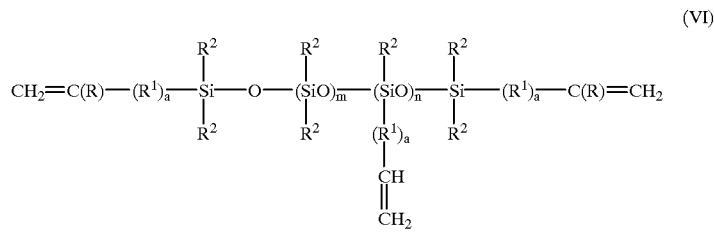  (VI)

where each R is independently hydrogen or a lower alkyl group, each $R^2$ is independently a lower alkyl group, each $R^1$ is independently a hydrocarbylene group containing from 1 to about 18 carbon atoms, each a is independently 0 or 1, and m and n are independent integers, and (b) a siloxane crosslinking agent as described above. In one preferred embodiment all of the R groups in (VI) are hydrogen, all of the $R^2$ groups are methyl, and a=0. The curable vinyl silicone systems used in the present invention most often contain from about 1 to about 10 parts by weight of the siloxane crosslinking agent per 100 parts of vinyl silicone.

For efficient curing, the vinyl organopolysiloxane and the siloxane crosslinking agent containing Si—H groups are mixed in amounts that will provide a composition containing 0.8 to 1.5 silicon-bonded hydrogen groups for every unsaturated group in the vinyl silicone. Compositions containing 0.9 to 1.2 silicon-bonded hydrogen groups for every alkenyl group in the composition are more preferred in order to minimize residual reactive functionality after curing.

There may also be included conventional ingredients designed to modify mold-release properties.

Vinyl silicone systems react by thermally induced addition-cure (hydrosilation) between siloxane crosslinkers and reactive vinyl-containing silicone polymers in the presence of a catalyst to form a cured polymer. The reaction takes place between vinyl-substituted polysiloxane and the Si-H group of the siloxane crosslinker.

The hydrosilation reaction may be catalyzed by silicone-soluble complex compounds of Group VIII transition metals, particularly platinum. Examples of useful catalysts are disclosed in the afore-mentioned U.S. Pat. Nos. 4,256,870 and 4,340,647. Platinum compounds are usually preferred although compounds of ruthenium, rhodium, palladium, osmium and iridium may also be employed. The preferred catalyst, in terms of both reactivity and cost, is chloroplatinic acid ($H_2PtCl_6.6H_2O$). Catalyst concentrations of from 0.0005 to about 0.5% by weight, based on the weight of the silicone mixture results in substantially complete polymerization. Other platinum compounds can also be used to advantage in some instances such as $PtCl_2$, dibenzonitrile platinum dichloride, and platinum divinyl and cyclovinyl complexes. Platinum on carbon also is effective for carrying out high temperature polymerizations.

In the normal use of vinyl silicone systems, a small amount of a divinyl or cyclovinyl compound may be included to serve as an inhibitor to prevent premature reaction between the silicone hydride and the vinyl groups following mixing of the coating components and before deposition onto a substrate. This inhibitor is removed or made ineffectual during the thermal curing process. Suitable vinyl-containing silicone emulsion systems for practice of this invention can be obtained from Dow Corning, Midland, Mich.; Rhone-Poulenc, Rock Hill, S.C.; Wacker-Chemic GmbH, Adrian, Mich.; and others. Examples include the Wacker 410E or 400E/V20 systems; the Wacker 38197VP/V20 system; and the Rhone-Poulenc PC107nxl/-PC31/PC95 system and others.

The silicone polymer component of the cured ink-imprintable silicone-release coating compositions of the present invention also may be a condensation cured silicone polymer component. The condensation cured silicone polymers generally are prepared by reacting a silicone compound containing silanol (Si—OH) groups with a siloxane crosslinking agent as described above (containing Si-H groups) in the presence of a catalyst, generally a Group IVA catalyst such as a tin catalyst or a Group VIII catalyst as described above. These mixtures of reactants generally are prepared as emulsions, and the emulsions may also include other materials such as stabilizers, fast cure additives, solvents, anchorage agents and/or release agents.

In one embodiment, the silicone compounds containing silanol groups are diorganopolysiloxanes which may be represented by the formula

(VII)

where each R is independently a monovalent hydrocarbon group free of aliphatic unsaturation such as methyl, ethyl, propyl, butyl, etc., and a is >0. The molecular weight of these polysiloxanes may range from about 2000 to about 20,000, and the viscosity at 25° C. ranges from about 25 to 1000 centipoise. One preferred silanol polysiloxane is a silanol-stopped linear polydimethylsiloxane fluid having a viscosity of 300 to 1000 cps.

Particularly useful as a crosslinking agent for the condensation curable silicones is a trimethyl-chain stopped polymethylhydrogen siloxane fluid having from about 10% to about 100% Si-H containing siloxy groups and having a viscosity in the range of about 25 to 1000 centipoise at 25° C.

The curing reaction which takes place between the silanol functional polysiloxane and the siloxane crosslinking agent is a condensation cure reaction. The compositions may be thermally cured by a catalyzed crosslinking reaction between the pendant hydroxyl groups of the silanol-chain stopped dialkyl-siloxane polymer and the Si—H groups of the siloxane crosslinking compound.

Condensation curable silicone systems are available commercially such as from Dow Corning (Midland, Mich.) under the trade designation Syl-Off® System IV which are reactive polysiloxane systems available in aqueous emulsion form. Specific components of such systems include Syl-Off 1171 paper coating or Syl-Off 22 paper coating together with a catalyst such as Syl-Off 22A catalyst, Syl-Off 1171 A catalyst or Syl-Off 164 catalyst. Syl-Off 1171 A catalyst is described as an aqueous emulsion of an organo tin complex. A typical formulation of a condensation silicone polymer component using the Syl-Off 1171 paper coating comprises 14.0 parts by weight of Syl-Off 1171 paper coating, 0.7 part by weight of Syl-Off 1171 A catalyst and 85.3 parts of water. A portion of the water may be replaced by an equivalent amount of carboxymethyl cellulose (CMC) to improve hold-out properties. A typical formulation utilizing Syl-Off 22 paper coating comprises 17.5 parts of Syl-Off 22 paper coating, 3.5 parts by weight of Syl-Off 22A catalyst, 0.5 part of glacial acetic acid and 78.5 parts of water. The pH of the formulation is generally maintained between about 6.0 and 6.5 using glacial acetic acid.

The polymer release material in the ink-imprintable release coatings of the invention may also be a fluoroacrylate polymer. Fluoroalkylacrylate polymers and copolymers can be utilized, particularly in emulsion form to provide the desirable release coatings useful in this invention. An example of a useful fluoroalkylacrylate emulsion is a product available from Mayzo Inc., Norcross, Ga. under the trade designation RA-1315W Release Coat. This product is an emulsion of a fluoroalkyl acrylate copolymer in water with acetic acid, acetone, ethylene glycol and emulsifier.

Although not required in all instances, the fluoroacrylate polymer release coatings may contain resin particles and/or inorganic particles as described above.

The release coating useful in the stamp constructions of this invention may also be a polyurethane coating which can be obtained by depositing the polyurethane on the substrate of printable material (e.g., paper) and thereafter heating the coated substrate to remove any carrier such as water. The polyurethane coatings may contain resin particles or mixtures of resin particles and inorganic particles as described herein. An example of a commercially available polyurethane useful in the release coatings of the invention is Zeneca R-9320 available commercially from Zeneca Corp, Wilmington, Mass.

A particularly useful type of polyurethane release coating comprises a modified silicone polymer which is a copolymeric material which may be classified as a urethane polymer containing silicone blocks. The silicone blocks are chemically bonded to the urethane polymer chain and are an integral part of the polymer. These modified urethane copolymers may be obtained by the reaction between a di-omegaorganofunctional dimethylsiloxane oligomer having terminal active hydrogen groups such as OH, SH, NHR, (where R is H or an alkyl group), a carboxyl group bearing monomer, and a diisocyanate. More particularly, the copolymers are obtained by reacting an active hydrogen terminated linear polydimethylsiloxane oligomer, a diisocyanate, an organic monomer with two active hydrogens and optionally, one or two carboxyl groups, and an amine to solubilize the copolymer in water. By the term active hydrogen is meant to include hydrogen-containing groups that readily react with isocyanates, and examples of such groups include OH, SH and $NH_2R$.

The reaction sequence may be illustrated as follows:

intermediate alkylene or alkylene oxy group. The Si—C linkage, unlike the Si—O—C linkage provides hydrolytic stability to the molecule. The second component is a difunctional organic compound terminated at each end with isocyanate groups (e.g., diisocyanate), the isocyanate groups being reactive with the active hydrogen of the OH, SH or NHR(R=H or alkyl) group of the reactants. The third component is a carboxyl functional organic monomer with two active hydrogens. Optionally, another component may be incorporated which is an organic monomer with two active hydrogens and no carboxyl group (e.g., a polyamine).

The dimethylorganosiloxane oligomer used in preparing the polysiloxane-urethane release polymers are well known materials. Hydroxy terminated oligomers may be conveniently prepared by reacting a linear polydimethylsiloxane oligomer having SiH terminal groups with, for example, an alkylene oxide or an allyl alcohol-alkylene oxide condensate. Thiol and amino-terminated silicones may be prepared by reacting a linear polydimethyl siloxane oligomer having SiH terminal groups with allyl chloride to form the compound with ≡Si—$CH_2CH_2CH_2$Cl terminal groups, and thereafter reacting this material with ammonia, an amine or $H_2S$ to provide a primary amine, secondary amine or thiol-ended oligomer.

The di-omegaorganofunctional dimethylsiloxane oligomers useful as reactants in preparing the modified silicone polymers may be represented by the following formula $$X-R-(Si(CH_3)_2O)_n-Si(CH_3)_2R^1X \quad \text{(VIII)}$$

wherein n is from 2 to about 200, preferably from about 5 to about 100, $R^1$ is a divalent aliphatic hydrocarbon group, and X is an active hydrogen containing group such as —SH, —NOH, —NHR, or —O—$(C_2H_4)(CH_2CH_2O)_a$—H wherein R is hydrogen or an alkyl group and a is 0 to 100.

The carboxyl-containing monomer may be represented by the following formula $$X-R^1(X)(-COOH)_m \quad \text{(IX)}$$

wherein X is as defined in Formula VIII, $R^1$ is a tri- or tetravalent group and m is 1 or 2. Examples of such carboxylic acids include 2,2'-dimethylol propionic acid, tartaric acid, etc.

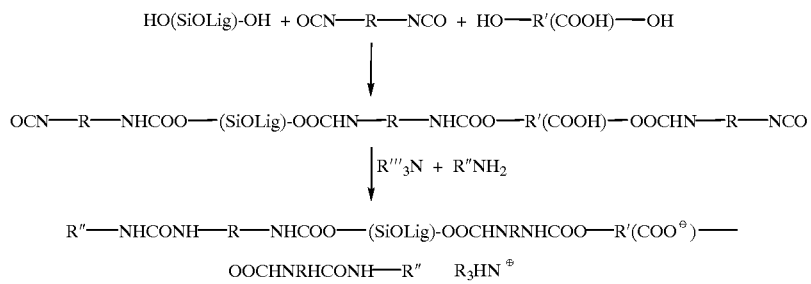

where Lig is an organic ligand R and R' are hydrocarbylene groups, and R" and R'" are hydrocarbyl groups.

The linear dimethylsiloxane oligomers have hydroxyl, thiol, primary amine or secondary amine functional groups at each of the two ends of the molecule, and these groups are bonded to the polydimethylsiloxane mid block through an Any of the isocyanates heretofore used in the formation of polyurethanes are suitable for use in the present reaction. Preferably, the isocyanates are diisocyanates which may include aliphatic diisocyanates, aromatic diisocyanates, cycloaliphatic diisocyanates, etc. Mixtures of two or more diisocyanates can be used. Examples of useful diisocyanates include toluene-2,4-diisocyanate, a mixture of toluene-2,4- and toluene-2,6-diisocyanate, metaphenylenediisocyanate, methylene-bisphenylisocyanate (MDI), hydrogenated MDI, isophorone diisocyanate and hexamethylene diisocyanate.

The preparation of the polysiloxane-urethane copolymers are generally carried out in two steps. In the first step, an isocyanate terminated prepolymer is formed by reacting an omega organofunctional dimethylsiloxane oligomer and a carboxyl-containing monomer with a stoichiometric excess of a diisocyanate. The reaction may be carried out neat or in the presence of a solvent to reduce viscosity. Heat or a catalyst may be used to speed up the reaction although mild reaction conditions, generally below 100° C., are preferred to avoid reacting the carboxyl groups with the NCO groups. Suitable solvents include liquids containing no active hydrogen capable of reacting with the diisocyanate, and examples of such solvents include N,2-methylpyrrolidone, N,N'-dimethylformamide, acetone, dioxane, etc.

The quantity of organic diisocyanate used in the reaction is dependent upon the quantity of active hydrogen groups in the reactive mixture, the particular diisocyanate compound used, the molecular weight of the diisocyanate, the NCO/OH ratio, etc. The precise amount of the diisocyanate used can be readily determined using these factors. The initial stoichiometric ratio of NCO to total OH is generally between about 1.3 and about 2.5, usually from about 1.4 to about 2.

If desired, catalysts that are normally used to accelerate the NCO reaction can be employed in the reaction. The use of a catalyst is particularly useful to accelerate the secondary OH/ortho NCO reaction, the SH/NCO reaction and reactions of aliphatic isocyanates. These catalysts include tertiary amines such as triethylamine, tributylamine, pyridine, and organometallic compounds such as stannous octoate, dibutyl tin dilaurate, zinc octoate and cobalt naphthenate.

The NCO terminated prepolymer thus prepared is then further reacted with an aliphatic diamine, diol or dithiol to form a copolymer. This reaction is called a "chain extension." The total NCO/total active hydrogen ratio is adjusted to about 1:1. In one embodiment, a primary or secondary diamine as well as a tertiary amine are dissolved in water and the prepolymer mixture while stirring. The diamine chain extends the prepolymer to form a copolymer almost instantaneously while the tertiary amine interacts with the carboxyl groups of the copolymer and solubilizers that copolymer in water. Typical diamines for chain extension include: isophorone diamine, omega-aminopolyether, aminoethylpiperazine, polymethylenediamine, xylylenediamine, etc.

The polysiloxane-urethane polymers and copolymers are characterized by the molecular weights by means of intrinsic viscosity when measured at 30° C. in a solvent such as tetrahydrofuran. Intrinsic viscosity as low as 0.05 provides good release characteristics.

Further details regarding the polysiloxane-urethane release agents and the method for preparing such release agents are described in U.S. Pat. No. 5,356,706. The disclosure of this patent is hereby incorporated by reference. The polysiloxane-urethane compounds described above can be alone or they can be mixed with various other film-forming materials to form a release coating. Thus, the modified silicone release copolymers can be intermixed with epoxy resins, polyesters, polyvinylacetate, ethylene vinyl acetate copolymers, polyamides, polyacrylics, polyurethanes, and polyvinylchloride. These mixtures and other film-forming resins may be dispersed as emulsions or latices in water.

An example of useful silicone-urethane copolymer is a commercial product available from Mayzo Inc., under the designation HITAC RA-1 1. This product is a one-component concentrated dispersion of a polyurethane in water.

The resin particles which form a part of the ink-imprintable release coating compositions of the present invention may be solid resin particles or the particles may be provided as an emulsion by a manufacturer. The particles may be directly dispersed into a silicone emulsion; a silicone polymer may be added to a particle emulsion; or an emulsion of the resin particles can be mixed with a silicone emulsion. The resin particles may be comprised of any resin which provides a release coating composition wherein the resin particles are capable of absorbing components of an ink or capable of allowing components of an ink to penetrate the release coating thereby providing an ink-imprintable coating surface which absorbs the ink on a non-smear, non-removable basis within an acceptable period of time.

In general, the organic resin particles incorporated into the polymer release compositions of the present invention may comprise condensation type polymers and copolymers such as polyurethanes, polyamides, polyureas, etc; and/or addition type polymers and copolymers of acrylic esters, methacrylic esters, alpha-olefins, styrenes, acrylonitriles, diene monomers, vinyl acetates, vinyl ethers, acrylamides, silicone-containing vinyl monomers, and fluorine and chlorine containing monomers. Particular examples of such polymers and copolymers include acrylate resins, ethylene-vinyl acetate copolymer resins, methacrylate resins, natural rubber, styrene polymers, styrene-acrylonitrile resins, olefin resins, styrene-butadiene resins such as carboxylated styrene-butadiene copolymers, styrene-isoprene copolymers and styrene-butadiene random and block copolymers, chloroprene, ethylene-vinyl acetate-acrylate terpolymers, silicone polymers, etc. The resins are preferably polyurethanes, polyamides, polyureas and silicone modified polyurethanes, polyamides and polyureas. An example of a useful polyurethane emulsion to be blended with the polymer release component is Zeneca R9320 from the Zeneca Corp, Wilmington, Mass.

The resins useful in forming the resin particles typically have a glass transition temperature ($T_g$) of from about minus 125° C. or less up to about 100° C. or more, a number average molecular weight greater than about two times their entanglement molecular weight (Me), and typically have a particle size sufficiently low to enable formation of an emulsifiable dispersion, typically in the order of 2500 Å or less. Resin particle domains which may be present in the cured coatings may have a greater particle size.

In one particularly preferred embodiment, the release coating compositions of the present invention comprise a blend of a silicone polymer and a resin selected from the group consisting of silicone modified urethane polymers, silicone modified polyamide polymers, and silicone modified polyurea polymers. The silicone modified resins appear to be more soluble in the silicone polymers, and the resulting coating compositions are believed to contain interpenetrating networks (IPN) of polydimethyl siloxane and the silicone modified polymers. These coating compositions containing the interpenetrating networks provide an improved balance of printability and release properties to the coating compositions.

The silicone urethane polymers may be prepared by the reaction of an isocyanate with a silanol oligomer such as

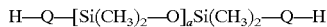

wherein a is between 2 and 200, Q is $OCH_2CH_2$ $(C_2H_4O)_c$—, where c is 0 to 100. An example of such a silanol oligomer is Dow Corning 2-8692. As the value of a increases, higher levels of polydimethyl silicone like functionality are obtained with correspondingly lower release values. As the value of c increases, the silicone urethane polymers exhibit increased solubility in water. An example of a silicone modified polyurethane useful in the present invention is Sancure 20008 available from B.F.Goodrich, Cleveland, Ohio. HITAC RA-1 1 (from Mayzo Inc.) Is another useful silicone-urethane copolymer resin.

Also useful as the resin particles in the release compositions of the invention are water-dispersible polyurethane polymers whose polymer chains contain segments derived from a silanol as described above and whose polymer chains are terminated with a silane. These types of silicone-urethane polymers are described in WO 95/21206.

Silicone-urea polymers can be made by the reaction of a silicone containing isocyanate prepolymer with an amine. More particularly, a silicone containing diisocyanate is reacted with a monoamine in a mole ratio of 1:1. The silicone containing isocyanate prepolymer can be prepared by reacting a silanol oligomer as described above with a diisocyanate such as hexamethylene diisocyanate or methylene (biscyclohexyl) diisocyanate. Examples of solvent borne polysiloxane-polyurea block copolymers useful in the present invention are described in U.S. Pat. No. 5,461,134. The disclosure of this patent relating to various polysiloxane-polyurea block copolymers and their preparation is hereby incorporated by reference.

Silicone amide polymers can be prepared by the reaction of a diisocyanate with a carboxylic acid. In particular, the silicone-amide polymers can be prepared by first reacting a silanol with a diacid such as succinic acid to form a diacid silanol. The diacid silanol is then reacted on a 1:1 molar basis with a diisocyanate to form a polyamine isocyanate terminated prepolymer. Aliphatic and cycloaliphatic diisocyanates are preferred. The reaction proceeds with decarboxylation of a terminal carboxylic acid group, and carbon dioxide is evolved. The isocyanate terminated silicone containing prepolymer is then reacted with a diol or a combination of diols wherein the OH:NCO ratio is 1:2. The reaction increases the molecular weight of the prepolymer but retains the free isocyanate terminal groups. Examples of diols which may be utilized include polyether diols of the general formula

wherein n is 2 to 200, or polyester diols represented by the formula

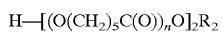

wherein $R_2$ is $C_xH_{2x}$ where x is an integer from 2 to about 6 and n is an integer from 2 to about 15. Diols with carboxylic acid functionality may be introduced by the addition of dialcohol compounds of the general formula

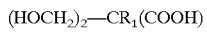

wherein $R_1$ is hydrogen or an alkyl group containing from 1 to about 5 carbon atoms. The acid will not react with the isocyanate in this instance because of stearic hindrance. The carboxylic functionality will reside in the hard segment of the urethane polymer. The hydrophobicity of the polymer is regulated by the addition of the polyester functionality.

The prepolymer is then neutralized with a tertiary amine to form a prepolymer salt, and the prepolymer salt can then be chain extended using a diamine, such as a diamine terminated polyethylene oxide or polypropylene oxide compound. The hydrophilicity or hydrophobicity can be controlled by moderation of the ethylene oxide: propylene oxide ratio.

The preparation of a silicone-amide polymer is illustrated as follows

EXAMPLE I

Silanol 2-8692 available from Dow Corning, Midland, Mich. (46.25 parts, 0.025 mole), succinic anhydride (5 parts, 0.05 mole), and 5 parts of N-methyl pyrrolidone (NMP) are charged to a reactor. The contents of the reactor are heated to 80° C. for one hour and then cooled to 45° C. Methylene (biscyclohexyl) diisocyanate (31.2 parts, 0.12 mole), dimethanol propionic acid (4.02 parts, 0.03 mole), Pluracol E600 (polyethylene glycol from BASF, 8.0 parts, 0.02 mole) and NMP are then added to the reactor. The reactor is again heated to 80° C. for 2 hours, and an additional aliquot of NMP is added. The reaction mixture is allowed to cool to 30° C. whereupon 2.67 parts (0.03 mole) of dimethyl amino ethanol in a mixture of 20 parts of ice and 45 parts of water are added to neutralize the carboxylic acid functionality. Water (150 parts) is then added to form an oil-in-water dispersion, and 6.66 parts (0.045 mole) of triethylene gylcol diamine (XTJ504 available from Huntsman Chemical) are then added in a mixture of 25 parts of ice and 75 parts of water to completely react with the terminal diisocyanate functionality. An additional aliquot of dimethyl amino ethanol (2.67 parts, 0.03 mole) in a mixture of 10 parts of ice and 20 parts of water is introduced into the reaction mixture to speed up the reaction and control the viscosity and particle size of the emulsion product. The mixture is stirred at 35° C. for an additional 3 hours to form the desired silicone-amide copolymer product.

The ink-imprintable release-coating compositions of the present invention also may include inorganic particles such as silica, silicates such as zinc orthosilicate (Taggant), clays, calcium carbonate, alumina, zinc oxide, tin oxide, titanium dioxide, and other metal oxides, and mixtures thereof. The inorganic particles can be used as solid powders or in colloidal form. The inorganic particles are effective in improving the ink-imprintable characteristics of the release coatings and can also be included in the coating compositions to enable automatic location of a postage stamp on an envelope for cancellation purposes.

It is desirable that the mixed emulsion at the time of application has a suitable pH value and is free of agents which inhibit cure or cure rate of the addition curable or condensation curable silicone systems. A suitable pH is about 8 or less, typically about 4 to about 7.0. Silicones are supplied in emulsion with a solids content of normally 35% to 52%, while the resin emulsions are typically supplied at a solids content of 10% to 70%. The solids content of the emulsions containing the silicone and the resin particles may be as low as 5% to 10% by weight, up to 90% by weight. Solids content may be optimized to facilitate the coating, drying and curing processes. Coating levels range from about 1 to about 10 grams/m$^2$ on a dry basis.

The ratio of the resin to the release polymer in the coating can be varied to control the release level without recourse to control release additives. An acceptable weight ratio of resin particles to curable polymer (e.g., silicone) provides a curable polymer content of up to about 90%. When the emulsions contain a vinyl silicone system, the emulsion preferably contains from about 10% to about 40% by weight of the vinyl silicone system and 60% to 90% by weight of the resin and optional inorganic particles. When condensation curable silicone systems are used, they preferably contain from about 30–70% by weight of the silicone system and about 30–70% by weight of particles. Such silicone systems allow penetration of the release coating by cancellation inks.

The following examples illustrate some of the silicone emulsions which can be used in the preparation of the ink-imprintable release-coating compositions of the present invention. Unless otherwise indicated in the following examples and elsewhere in the specification and claims, all parts and percentages are by weight, temperatures are in degrees Centigrade, and pressures are at or near atmospheric pressure.

The following general procedure is utilized for preparing the silicone emulsions of the followings examples. In a first container, a mixture of the vinyl-containing silicone and the organo-hydrogen siloxane crosslinker is prepared by mixing the two emulsions. The mixture is stirred until homogeneous. In a second container, the emulsion containing the resin filler is diluted with water to form an approximately 35% solid solution and stirred until the filler is homogeneously dispersed in the water phase. The silicone mixture is then added as required to the diluted resin dispersion, and the mixture is stirred for approximately 5 minutes. Surfactants, catalysts and inorganic particles are added to the dispersion as desired and as indicated in the examples.

| Component | Pts./wt. |
|---|---|
| Example 1 | |
| Vinyl-containing silicone (Wacker dehesive 38197VP) | 10.35 |
| Organo-hydrogen siloxane crosslinker (Wacker V20) | 1.55 |
| Polyurethane emulsion (Zeneca R9320) | 57.40 |
| Water | 30.70 |
| Example 2 | |
| Vinyl-containing silicone (Wacker dehesive 38197VP) | 17.24 |
| Organo-hydrogen siloxane crosslinker (Wacker V20) | 2.58 |
| Silicone modified polyurethane (BFGoodrich Sancure 20008) | 74.24 |
| Surfactant (FC-129 from 3M) | 0.30 |
| Water | 5.64 |

| Component | Pts./wt. |
|---|---|
| Example 3 | |
| Vinyl-containing silicone (Wacker dehesive 38197VP) | 14.40 |
| Organo-hydrogen siloxane crosslinker (Wacker V20) | 2.15 |
| Polyurethane emulsion (Zeneca R-9320) | 69.30 |
| Platinum catalyst (Wacker ET-11951) | 0.65 |
| Zinc orthosilicate | 4.00 |
| Water | 9.50 |
| Example 4 | |
| Vinyl-containing silicone (Wacker dehesive 38197VP) | 20.10 |
| Organo-hydrogen siloxane crosslinker (Wacker V20) | 3.00 |
| Sancure 20008 | 68.95 |
| Surfactant FC-129 (3M) | 0.30 |
| Water | 7.65 |
| Example 5 | |
| Vinyl-containing silicone (Wacker dehesive 38197VP) | 12.00 |
| Organo-hydrogen siloxane crosslinker (Wacker V20) | 1.79 |
| Silicone-modified polyamide (Example I) | 68.97 |
| Surfactant FC-129 | 0.30 |
| Water | 16.94 |
| Example 6 | |
| Vinyl-containing silicone (Wacker dehesive 38197VP) | 17.23 |
| Organo-hydrogen siloxane crosslinker (Wacker V20) | 2.58 |
| Silicone-modified polyamide (Example I) | 74.24 |
| Surfactant FC-129 | 0.30 |
| Water | 5.65 |

The ink-imprintable release coating compositions of the present invention which have been described above are useful in particular in preparing ink-imprintable label, tape and stamp constructions, and more particularly, in preparing self-wound postage stamp and stacked sheet (or sheetlet) stamp constructions without the use of an independent release liner to prevent the stamps from sticking together. In one embodiment, the ink-imprintable stamp constructions generally will comprise a plurality of contiguous stamps which are self wound into a roll configuration without the use of an independent release liner, and the stamps have pressure-sensitive adhesive on the back surface of the stamps and a cured ink-imprintable release coating as described above on the face surface of the stamps. The stamps are maintained in the roll configuration by cooperation of the pressure-sensitive adhesive and the release coating. The ink-imprintable release coating is ink-cancelable and enables ready separation of a stamp from the roll without damage to the paper facestock or the printed surface of the stamp.

More significantly, the release coating provides an ink-imprintable release for the pressure-sensitive adhesive employed in the stamp construction assembly. The bond between the release coating and the face surface of the stamp is greater than the force required to separate the pressure-sensitive adhesive from the release coating as the stamp construction is unwound.

In one embodiment, an ink-imprintable stamp construction in accordance with the present invention comprises a plurality of contiguous stamps in a roll or stacked sheet configuration without an independent release liner wherein the stamps have a pressure-sensitive adhesive on the back surface of the stamps and a cured ink-imprintable silicone polymer, fluoroalkylacrylate polymer or copolymer, or polyurethane release coating on the face surface of the stamps.

The silicone polymer release coatings preferably contain resin particles, resin particle domains, or both, and may also contain inorganic particles. Resin particles, resin particle domains, inorganic particles, and mixtures thereof may be present in the fluoroalkylacrylate polymer and polyurethane release coatings also.

In another embodiment, an ink-imprintable stamp construction of the invention comprises a plurality of contiguous stamps in a roll configuration wherein the stamps each comprise (A) a layer of ink-imprintable material having a face surface and a back surface;

(B) an ink-imprintable silicone release coating bonded to the face surface of the ink-imprintable material, said release coating comprising a blend of an addition cured or condensation cured silicone polymer component and resin particles, resin particle domains or both wherein the resin is selected from polyurethanes, polyamides and polyureas; and (C) a layer of a pressure-sensitive adhesive bonded to the back surface of the layer of ink-imprintable material whereby the stamp construction is retained in a rolled configuration by cooperation of the pressure-sensitive adhesive layer and the release coating, and the bond between the release coating and the face surface of the layer of material (A) is greater than the force required to separate the release coating from the pressure-sensitive adhesive as the stamp construction is unwound.

The thickness of the layer of ink-imprintable material (e.g., paper) may range from about 50 to about 150 microns, but is from about 80 to about 100 microns for stamp applications. The thickness of the release coating (e.g., comprising silicone, fluoroacrylate polymer or copolymer, or polyurethane) generally is in the range of from about 0.5 to about 10 microns, more often from about 1 to about 5 microns. The thickness of the layer of pressure-sensitive adhesive generally is in the range of from about 15 microns to about 30 microns, more often from about 20 to about 25 microns.

The ink-imprintable silicone release coating generally is derived from an aqueous-based emulsion, and as mentioned above, the release force or peel at a variety of peel-rates may be controlled by the silicone to particle ratio (resin particles and inorganic particles), the nature of the particles used, the degree of interaction between the silicone and the particle phases, the crosslink density of the cured silicone phase, and the coating weights.

In the production of the release coating on the stamps of the present invention, the addition curable or condensation curable silicone component, the siloxane crosslinking agent (generally the hydrosilane), the catalyst, and the resin particles are combined to achieve a mixture (emulsion) suitable for coating. The combined emulsion desirably has a pH of less than about 8. The emulsion is applied to the face surface of the stamp or ink-imprintable material by any technique known in the art, the coating is dried, generally by heating, to remove water, and curing occurs. A typical dry coat weight for the release coating is about 2 to 5 grams per square meter. This provides a release surface which is clear and solid and remains substantially on the face surface of the substrate which is generally the face surface of a ink-imprintable material used in the formation of stamps.

The layer of ink-imprintable material which is coated with the silicone-release coating compositions of the present invention may be of any suitable material which has an affinity to inks to enable printing of the graphics of the quality employed, for example, in stamp construction. Generally, the material is a printable paper, and the following is a non-exclusive list of products suitable for use as stamp grade paper:

(1) Postage stamp paper available rom the P.H. Glatfelter Co. of Spring Grove, Pa. having a weight of 65 pounds and a thickness of 0.0034 inches.

(2) Dunn No. 55 Spectral Coated No. 019 stamp grade paper available from James River Corporation of James River, Va.

(3) White coated postage stamp paper No. LP-57 with barrier coating available from Henry & Leigh Slater Ltd. of Bollington-Maccelsfield-Chesire, England.

(4) No. LP-57 stamp grade paper available from Paper Corporation of the United States of New York, N.Y.

(5) No. LP-57 stamp grade paper available from Champion International Corporation of Stanford, Conn.

The pressure-sensitive adhesives employed in the stamp constructions of the present invention are of a nature that they provide sufficient tack at expected use temperatures. Such adhesives bond to a variety of paper substrates (envelopes) over the range of expected use temperatures with a bond strength to achieve a permanent bond such that the stamp cannot be removed from the paper substrate with the occurrence of a fiber pick or paper tear.

A variety of pressure-sensitive adhesives can be utilized including hot-melt adhesives, water-based adhesives, and solvent-based adhesives. Such adhesive compositions are described in, for example, "Adhesion and Bonding", *Encyclopedia of Polymer Science and Engineering*, Vol. 1, pages 476–546, Interscience Publishers, 2nd Ed. 1985. Such compositions generally contain an adhesive polymer such as natural, reclaimed or styrene-butadiene rubber, styrene butadiene or styrene isoprene block copolymers, polyisobutylene, poly(vinyl ether) or poly(acrylic) ester as a major constituent. Other materials may be included in the pressure-sensitive adhesive compositions such as resin tackifiers including, for example: rosin esters, oil-soluble phenolics, or polyterpenes; antioxidants; plasticizers such as mineral oil or liquid polyisobutylenes; and fillers such as zinc oxide or hydrated alumina.

The pressure-sensitive adhesive useful in the present invention may be hot-melt rubber based materials or acrylic based materials. Examples of hot melt adhesives include styrene-butadiene-styrene and styrene-isoprene-styrene block copolymers that may be combined with a hydrocarbon resin or resin esters as disclosed in U.S. Pat. No. 4,080,348 to Korpman to tackify the copolymers. Other patents describing hot-melt pressure-sensitive adhesives include U.S. Pat. Nos. 3,676,202, 3,723,170 and 3,787,531.

Useful acrylic pressure-sensitive adhesives are typically copolymers made by bulk polymerization in the presence of chain terminating agents. Exemplary monomers useful in forming pressure-sensitive acrylic adhesives include but are not limited to acrylic and methacrylic acids, 2-ethylhexyl acrylate, butyl acrylate, ethyl acrylate, methyl methacrylate, 2-hydroxyethyl acrylate, isooctyl acrylate, etc.

The pressure-sensitive adhesive preferably has a "G," dynamic storage shear modulus of greater than about 10,000 dynes/Cm² at a deformation rate of 10⁻⁷ radians per second at 23° C. as measured on a Rheometrics RDS-7700. Particular examples of useful pressure-sensitive adhesives include acrylic-based emulsions such as S-490 Adhesive available from Fasson, Painesville, Ohio; a hot melt tackified Kraton-based adhesive (styrene-isoprene-styrene block copolymer) also available from Fasson under the designation S-21 76 Adhesive; and a solvent-based styrene-butadiene adhesive.

A list of the characteristics of a particular example of an acrylic type pressure-sensitive adhesive useful in the present invention is found below in Table I.

soluble polymer including polyacrylic acids, polyacrylates, polyvinyl alcohols, hydroxycellulose, hydroxyalkyl celluloses, polyvinylpyrrolidone, polyethylene oxides, alginates, xanthan gum, polyacrylamides, etc. Specific examples of water-soluble or water dispersible primers include polyvinylpyrrolidone from GAF Corporation, Wayne, N.J., and Pancake Gum; Brownbridge from Kimberly Clark Corp., Troy, Ohio. The amount of primer between the back surface of the layer of printable material and the pressure-sensitive adhesive should be sufficient to enable ready separation of the pressure-sensitive adhesive. Generally a thin layer of primer of a thickness in the range

TABLE I

| Glass Transition (Tg), ° C. | | | −38 |
|---|---|---|---|
| William's Plasticity (WPI), mm | | | 3.42 |
| Minimum Application Temp., ° F. | | | 10 |
| ° C. | | | −12 |
| Adhesive coat Weight (g/m²) | | | 24 |
| 10 minute 90° Peel (pli) | | Initial | 1.3 cl/Tear |
| | | 6 wk RT | 1.5 cl, leg |
| | | 6 wk 70° C. | 1.7 Tear |
| Looptack (pli) | | Initial | 1.8 clean |
| | | 6 wk RT | 2.4 clean |
| | | 6 wk 70° C. | 2.3 clean |
| Repositionability | | | Initial/6 wk RT |
| | Tyvek | 30 seconds | A/A |
| | | 60 seconds | A/A |
| | | 90 seconds | A/A |
| | | 1 hour | A/F |
| | Woven | 30 seconds | D/D |
| | | 60 seconds | NA |
| | | 90 seconds | NA |
| | | 1 hour | NA |
| | Bond | 30 seconds | D/D |
| | | 60 seconds | NA |
| | | 90 seconds | NA |
| | | 1 hour | NA |
| 1 Hour Permanence | Tyvek | Initial | F |
| | | 6 wk RT | F |
| | Woven | Initial | D |
| | | 6 wk RT | D/F |
| | Bond | Initial | F |
| | | 6 wk RT | D/F |

Key for Repositioning and Permanence:
A = Clean
B = Slight substrate (envelope)
C = Substrate pick
D = Substrate tear
E = Face pick
F = Face tear
G = Spot adhesive transfer
NA = Not applicable In another embodiment of the invention, a primer is in contact with the back surface of the layer of printable material and is positioned between the back surface of the layer of printable material and the pressure-sensitive adhesive. Preferably, the primer is a solvent-soluble, water-soluble or a water dispersible primer, and more preferably, a water-soluble primer. The use of a soluble or dispersible primer between the back surface of the ink-imprintable material (back surface of the stamp) and the pressure-sensitive adhesive enables separation of the stamp from the pressure-sensitive adhesive and a substrate such as an envelope by soaking the stamp in water or a solvent. In this manner, stamp collectors can easily remove the primer and, therefore, the pressure-sensitive adhesive, from the back of the stamp. The soluble primers are generally polymer compositions. The water-soluble primers may be any waterof about 0.1 to about 2 microns, and more often from about 0.2 to about 0.8 microns, is effective.

In general, the primer coat between the back surface of the stamp and the pressure-sensitive adhesive is of a nature which will allow the stamp to be separated from the adhesive while still wet after soaking in water (or solvent) for 30 minutes and with slow peeling of the face stock of the stamp from the adhesive layer which stays with the envelope paper. If in some situations, some adhesive remains with the stamp, a small amount of rubbing should enable removal of the residual adhesive from the stamp. While the stamp is still wet, it should not feel tacky, or if it retains adhesive which cannot be easily removed from the stamp by rubbing, the stamp may be reimmersed in water to remove the remaining adhesive.

Figure 2:
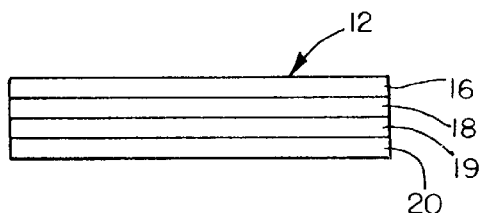
FIG. 2 is a fragmentary schematic cross-sectional view of one preferred embodiment of the stamp construction of the invention.

The stamp constructions of the present invention are illustrated in the drawings. FIGS. 1 and 2 illustrate cross-sectional views of the stamp constructions of the invention.

FIG. 1 illustrates a cross-section of a stamp 12 which comprises an ink-imprintable or ink-cancelable release coating 16 on one surface (the face side) of a layer of printable material 18 which is provided with a layer of pressure-sensitive adhesive 20 on the opposite surface (the backside) of the layer of printable material 18.

FIG. 2 illustrates a cross-section of another stamp of the invention in which the stamp 12 comprises an imprintable or ink-cancelable release coating 16 on one surface (the face side) of a layer of printable material 18 which is provided with a pressure-sensitive adhesive 20 on the opposite surface of the printable material, and the pressure-sensitive adhesive is suitably coupled to the back of the layer of printable material 18 by a water-solvent-soluble, water-soluble or water-dispersible primer 19. The release coat 16 further provides means to detect a location of a stamp on the envelope in an automatic cancellation machine when the release coat contains detectable particles such as zinc orthosilicate (Taggant). Alternatively, the detectable particles can be coated onto the printable material 18 before printing and before the release coat 16 is applied to the printable material.

Figure 3:
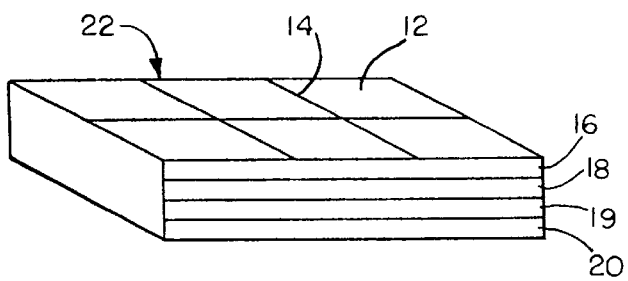
FIG. 3 is a perspective view of a sheetlet stamp construction of the invention.

FIG. 3 illustrates one embodiment of the invention wherein sheets comprising a plurality of stamps are prepared. In particular, FIG. 3 illustrates a sheet 22 comprising a plurality of stamps 12 separated by lines or marks 14. Each stamp 12 comprises an imprintable or ink-cancelable release coating 16 on one surface (the face side) of a layer of printable material 18 which is provided with a pressure-sensitive adhesive 20 on the opposite surface of the printable material suitably coupled to the back of the layer of printable material 18 by a soluble or dispersible primer 19 as described above.

As noted above, the stamp constructions of the present invention may comprise stacked or block sheet configurations without an independent release liner separating the individual sheets. Undesirable adhesion between the pressure-sensitive adhesive of one sheet and a second sheet is prevented by the presence of the ink-imprintable release coatings described herein.

Figure 4A:
FIG. 4A is a fragmentary cross-sectional view of one form of stacked sheetlets of stamps.

One of the advantages of the stamp constructions of the present invention is that sheets comprising a plurality of stamps can be stacked one upon another without the need of a release liner between the sheets. The stacks of sheets (also sometimes referred to as blocks of sheets) which may be prepared in accordance with the present invention may be straight-sided vertical stacks such as shown in FIG. 4A illustrates a stack or block 24 of superimposed sheets of stamps 22 wherein the pressure-sensitive adhesive layer 20 of one sheet is in contact with the release coating 16 of an adjacent sheet. Although the stack or block construction 24 illustrated in 4A is capable of maintaining its integrity because of the interaction between the pressure-sensitive adhesive layer 20 and the release coating 16 of adjacent sheets, the sheets can be separated easily because of the presence of the release coating 16.

Figure 4B:
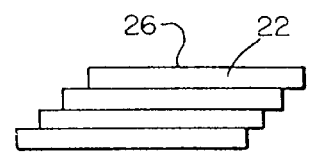
FIG. 4B is a fragmentary cross-sectional view of another form of stacked sheetlets of stamps.

FIG. 4B illustrates another block or stack 26 of sheets 22 wherein each sheet 22 is displaced a short lateral distance from the sheet below it.

Figure 5:
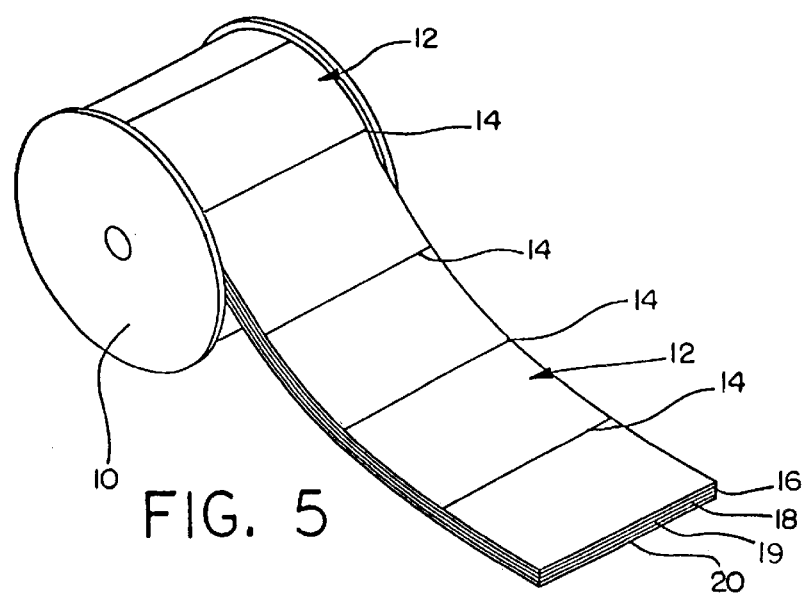
FIG. 5 is a perspective view of another stamp construction of the present invention.

FIG. 5 illustrates a self-wound roll stamp construction which comprises a roll 10 of a plurality of stamps separated by lines or marks 14 which delineate the paper cutting location between stamps or perforations separating each stamp. Each stamp comprises an ink-imprintable or ink-cancelable release coating 16, as described above, on one surface (the face side) of a layer of printable material 18 (e.g., paper), which is provided with a pressure-sensitive adhesive 20 on the opposite surface and which is suitably coupled to the back of the layer of printable material 18 by a soluble or dispersible primer 1 9. As indicated earlier, the release coat 16 further provides means to detect the location of a stamp on an envelope in an automatic cancellation machine when the topcoat contains detectable particles such as zinc orthosilicate. Alternatively, the detectable particles can be coated onto the printable material 18 before printing and before the release coat 1 6 is applied to the material. In the later case, the release coat must not interfere with or block the means to detect the stamp location.

The stamp construction of the present invention may be manufactured by forming a laminate of (a) the layer of ink-imprintable paper, (b) the silicone-based release coating on the face surface of the paper, (c) a pressure-sensitive adhesive on the back surface of the layer of paper, and (d) optionally, a water-soluble primer between the back surface of the paper and the pressure-sensitive adhesive. The face surface of the paper is pre-printed with stamp graphics, and, if desired, the back surface also may be printed. Water-borne inks can be used. The assembly is then slit and wound into rolls or cut into sheets of desired stamp value.

As noted above, the ink-imprintable silicone release surface must allow the stamp to be peeled (released) from the adhesive surface when in roll or stacked sheet form at a force which is sufficiently low so as not to damage the printed surface or the paper backing and yet provide sufficient adhesion to the pressure-sensitive adhesive to prevent premature dispensing of the stamps by unravelling of the roll. The release force is generally defined as the force required to peel the pressure-sensitive adhesive at a specified rate and angle from a release-coated surface. In the following Examples A–D, the release force is determined using a 90 Degree Peel Adhesion Test (TLMI Test No. VII, LD.4-68 PSTC-2, 5th Edition). This test measures the peeling force necessary to remove a pressure-sensitive adhesive from a substrate when the peel load acts in a direction perpendicular to the applied adhesive.

In this test, pressure-sensitive adhesive strips are pressed into a release coated surface, and after aging, the release force is measured when the adhesive strips are peeled at a 90° angle at a speed of 300 inches per minute. The instrument used is a release and adhesion tester available from Testing Machines Inc. under the designation TMI Model No. 80-14-00. The release force is expressed in grams/inch width. Three adhesive tapes are peeled from each substrate and the resulting values are averaged. The U.S. Postal Service (USPS) target value is between 14 and 475 g/in for self wound postage stamp applications. In practical stamp dispensing tests, release forces of under 100 g/in are preferred.

In some self-wound pressure-sensitive applications it is desirable to print on the surface of the label, tape or stamp.

In postage stamp applications it is a requirement since cancellation marks are used by the Postal Service as a security device to ensure the stamp is not reused. For the purposes of this application, an acceptable measure of printability is given in the United States Postal Service Specification USPS-S-1282A Appendix 1 Section 20 herein incorporated by reference. This test measures the time required for USPS 91 4M23B cancellation ink to dry once applied to the surface of a postage stamp. The cancellation mark is considered dry if there is no ink smear and no ink transfer when touched with a finger tip. USPS acceptable dry-times are 5 minutes and less.

The following examples illustrate the preparation of constructions in accordance with the present invention, and the release characteristics and ink-printability of the release coatings of the invention.

EXAMPLE A

The emulsion of Example 1 is applied with a No. 12 Meyer rod to a stamp paper using a laboratory pilot coater. The coated stamp paper is then placed in an oven at about 155° C. for about 30 seconds to dry the emulsion and cure the silicone layer. After cooling, three strips of a one-inch wide S-21 76 rubber base pressure-sensitive tape are placed on the coated surface and pressured by rubber rolling at 20 psi. These overtapes are aged under Kiel aging test conditions: 70° C. for 20 hours at 0.25 psig. The averaged release force is 30 grams/inch at 300-inch/min speed. The drying time for the release coating from U.S. Postal Service ink (glycol base) is 6 to 8 minutes and the ink is permanently affixed. These data indicate the release coating of Example 1 has a good ink-printability and release efficiency.

EXAMPLE B

The procedure of Example A is repeated except the pressure sensitive adhesive tape utilized contains S490 emulsion acrylic based adhesive. The drying time in the example is 6 to 8 minutes, and the average release force is 1 40 g/in.

EXAMPLE C

The emulsion of Example 2 is applied with a No. 12 Meyer rod to a stamp paper using a laboratory pilot coater. The coated paper is then placed in an oven at 155° C. for 30 seconds to dry the emulsion and cure the silicone layer. After cooling, three strips of a one-inch wide S-2176 rubber based pressure-sensitive tape are placed on the coated surface and pressed by rubber rolling at 20 psig. These overtapes are aged under Kiel aging test conditions: 70° C. for 20 hours at 0.25 psig. The averaged release force is 27 gram/inch at 300 inch/min speed. The drying time for the release coating from United States Postal Service ink (glycol base) is less than 5 minutes and the ink is permanently affixed. These data indicate the release coating of Example 2 has a very good ink printability and release efficiency.

EXAMPLE D

The emulsion of Example 3 is applied with a No. 6 Meyer rod to a stamp paper using a laboratory pilot coater. The coated paper is then placed in an oven at 155° C. for 2 minutes. After cooling, three strips of a one-inch wide S-490 acrylic based pressure-sensitive adhesive tape are placed on the coated surface and pressed by rubber rolling at 20 psig. These overtapes are aged by under Kiel aging conditions such as described in Example A. The averaged release force is 185 grams/inch at 300 inch/min speed. The drying time for the release coating from United Postal Service ink (glycol base) is around 7 minutes and the ink is permanently affixed. The retained adhesion of the S-490 adhesive is about 75%, and extractable silicone is less than 10%. These data indicate the release coating has good ink-printability and release efficiency.

EXAMPLE E

The emulsion of Example 4 is applied with a No. 12 Meyer rod to a stamp paper using a laboratory pilot coater. The coated paper is then placed in an oven at 155° C. for about 30 seconds. After cooling, three strips of a one-inch wide S-2176 rubber-based pressure-sensitive tape are placed on the coated surface and pressed by rubber rolling at 20 psig. These overtapes are aged under Kiel aging test conditions of 70° C. for 20 hours at 0.25 psig. The averaged release force is 50 grams/inch at 300 inch/min speed. The United States Postal Service ink (glycol base) applied to the release coating was dry in less than 5 minutes. These data indicate this formulation gave very good release and ink-printability.

EXAMPLE F

The procedure of Example A is repeated except that the product of Example 1 is replaced by the product of Example 5. The average release force after one day of aging at 70° C. is 40 g/in, and the peak release force is 86 g/in. After aging one week at 70° C., the average release force is 72 g/in and the peak release force is 167 g/in. The cancellation ink dry time is 2 minutes under both aging conditions.

EXAMPLE G

The procedure of Example A is repeated except that the product of Example 1 is replaced by an equivalent amount of the product of Example 6. The average release force is 25 g/in and the ink dry time is less than 5 minutes.

Control examples of ink-imprintable release coatings containing addition curable silicones and other resin particles such as ethylene vinyl acetate (EVA) and styrene-butadiene rubber (SBR) are prepared from the following formulations. The SBR product used in the examples is available from Reichold as Synthomer 85P16. The EVA product is available from Air Products as Airflex 140. The indicated silicone emulsions were prepared by the procedure described above with respect to the preparation of the emulsions of Examples 1–6.

| Component | Pts./wt. |
|---|---|
| Example C-1 | |
| Vinyl-containing silicone (Wacker dehesive 38197VP) | 17.24 |
| Organo-hydrogen siloxane crosslinker (Wacker V20) | 2.58 |
| Styrene-butadiene resin (Reichold Synthomer 85P16) | 49.00 |
| Water | 31.19 |
| Example C-2 | |
| Vinyl-containing silicone (Wacker dehesive 38197VP) | 17.23 |
| Organo-hydrogen siloxane crosslinker (Wacker V20) | 2.58 |
| Ethylene vinyl acetate emulsion (Air Products Airflex 140) | 52.19 |
| Water | 28.00 |
| Example C-3 | |
| Vinyl-containing silicone (Wacker dehesive 38197VP) | 9.88 |
| Organo-hydrogen siloxane crosslinker (Wacker V20) | 1.55 |
| Ethylene vinyl acetate emulsion (Air Products Airflex 140) | 52.19 |
| Water | 35.91 |
| Example C-4 | |
| Vinyl-containing silicone (Wacker dehesive 38197VP) | 10.35 |
| Organo-hydrogen siloxane crosslinker (Wacker V20) | 1.55 |
| Styrene-butadiene resin (Reichold Synthomer 85P16) | 57.40 |
| Water | 30.70 |
| Example C-5 | |
| Vinyl-containing silicone (Wacker dehesive 38197VP) | 20.10 |
| Organo-hydrogen siloxane crosslinker (Wacker V20) | 3.00 |
| Styrene-butadiene resin (Reichold Synthomer 85P16) | 45.50 |
| Water | 41.40 |

The above control emulsions are utilized to prepare stamp constructions of the same type and by the same procedure described above with regard to Examples A–G, and the stamp constructions were examined for ink imprintability, ink drying and release force. The results of the testing are summarized in the following table along with the results obtained with Examples A–G.

TABLE

STAMP CONSTRUCTION PROPERTIES
Release Coating Formulation

| Example | % Silicone | Resin Particle Type | % w | Adhesive | Ink Dry Time | Release Force (g/in) |
|---|---|---|---|---|---|---|
| E | 35 | SiPU[1] | 65 | Rubber | under 5 minutes | 50 |
| C-5 | 35 | SBR | 65 | Acrylic | over 3 hours | 96 |
| D | 30 | Si-PU[1] | 70 | Rubber | under 5 minutes | 27 |
| G | 30 | Si-PA[2] | 70 | Rubber | under 5 minutes | 25 |
| C-2 | 30 | EVA | 70 | Rubber | over 3 hours | >100 |
| C-1 | 30 | SBR | 70 | | | |
| F | 24 | SiPA[2] | 76 | Rubber | 2 minutes | 40 |
| A | 18 | Urethane | 82 | Rubber | 6 to 8 minutes | 30 |
| B | 18 | Urethane | 82 | Acrylic | 6 to 8 minutes | 140 |
| C | 18 | Urethane | 82 | Acrylic | about 7 minutes | 185 |
| C-3 | 18 | EVA | 82 | Rubber | over 3 hours | 23 |
| C-3 | 18 | EVA | 82 | Acrylic | over 3 hours | 29 |
| C-4 | 18 | SBR | 82 | Rubber | over 3 hours | 14 |
| C-4 | 18 | SBR | 82 | Acrylic | over 3 hours | 31 |

[1]SiPU = Silicone modified polyurethane
[2]SiPA = Silicone modified polyamide

As can be seen from the results reported in the above table, the stamp constructions which have been coated with a release coating containing polyurethane and polyamide resin particles exhibit reduced dry time and/or reduced release force when compared to similar formulations containing other resin particles such as EVA and SBR.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. An ink-imprintable label, tape or stamp construction comprising a plurality of contiguous stamps in a roll or stacked sheet configuration without an independent release liner wherein the labels, tapes or stamps have a pressure-sensitive adhesive on the back surface and an ink-imprintable cured release coating on the face surface comprising (a) a polymer selected from the group consisting of silicones, fluoroacrylates and polyurethane polymers, and (b) resin particles, resin particle domains, or both, wherein the resin particles or resin particle domains comprise a resin which is different from the polymer and which is selected from the group consisting of polyurethanes, polyamides and polyureas.

2. The construction of claim 1 wherein the ink-imprintable release coating comprises an addition cured vinyl silicone polymer component or a condensation cured silicone polymer component.

3. The construction of claim 1 wherein the resin particles (b) comprise polyurethane or polyamide resin particles.

4. The construction of claim 1 wherein the release coating comprises by weight from about 2% to about 90% of the cured silicone component.

5. The construction of claim 1 wherein the release coating comprises by weight from about 10% to about 70% of the cured silicone component.

6. The construction of claim 1 wherein the cured silicone component comprises an addition cured silicone, and the release coating comprises by weight from about 10% to about 40% of the cured silicone polymer.

7. The construction of claim 1 wherein the cured silicone component comprises a condensation cured silicone, and the release coating comprises by weight from about 30% to about 70% of the silicone.

8. The construction of claim 1 wherein the release coating also comprises inorganic particles.

9. The construction of claim 8 wherein the inorganic particles selected from the group consisting of silica, silicates, clays, calcium carbonate, alumina, zinc oxide, tin oxide, titanium dioxide, zinc ortho silicate and mixtures thereof.

10. The construction of claim 1 wherein the pressure-sensitive adhesive is is applied as a hot melt, as a solution or as an emulsion.

11. The construction of claim 1 wherein the pressure-sensitive adhesive comprises an acrylic emulsion adhesive.

12. The construction of claim 11 wherein the pressure-sensitive adhesive comprises a tackified styrene-isoprene-styrene rubber block copolymer hot-melt adhesive.

13. The construction of claim 1 wherein the release coating comprises (a) a cured polysiloxane and (b) a silicone-modified polyurethane or silicone-modified polyamide.

14. An ink-imprintable stamp construction comprising a plurality of contiguous stamps in a roll or stacked sheet configuration without an independent release liner wherein the stamps have a pressure-sensitive adhesive on the back surface of the stamps and an ink-imprintable cured release coating on the face surface of the stamps which is obtained from an aqueous emulsion comprising (a) a polyurethane, or a fluoroalkylacrylate, or a curable silicone release material and (b) resin particles, resin particle domains, or both, wherein the resin particles or resin particle domains comprise a resin selected from the group consisting of polyamides and polyurethanes different from the polyurethane release material.

15. The stamp construction of claim 14 wherein the emulsion comprises an addition or condensation curable silicone and resin particles, resin particle domains or both.

16. The stamp construction of claim 14 wherein the emulsion also contains inorganic particles.

17. An ink-imprintable stamp construction comprising a plurality of contiguous stamps in a roll configuration without an independent release liner wherein the stamps each comprise (A) a layer of ink-imprintable material having a face surface and a back surface;

(B) an ink-imprintable silicone release coating bonded to the face surface of the ink-imprintable material, said release coating comprising an addition cured or condensation cured silicone polymer component, and resin particles, resin particle domains or both, wherein the resin particles or resin particle domains comprise a resin is different from the polymer component and is selected from the group consisting of polyurethanes, polyamides and polyureas; and (C) a layer of a pressure-sensitive adhesive bonded to the back surface of the layer of ink-imprintable material whereby the stamp construction is retained in a rolled configuration by cooperation of the pressure-sensitive adhesive layer and the release coating, and the bond between the release coating and the face surface of the layer of material (A) is greater than the force required to separate the release coating from the pressure-sensitive adhesive as the stamp construction is unwound.

18. The stamp construction of claim 17 wherein the release coating comprises by weight from about 2% to about 90% of the cured silicone component.

19. The stamp construction of claim 17 wherein the release coating comprises by weight from about 10% to about 70% of the cured silicone component.

20. The stamp construction of claim 17 wherein the cured silicone component comprises an addition cured silicone, and the release coating comprises by weight from about 10% to about 40% of the cured silicone.

21. The stamp construction of claim 17 wherein the cured silicone component comprises a condensation cured silicone and the release coating comprises by weight from about 30% to about 70% of the cured silicone.

22. The stamp construction of claim 17 wherein the release coating also comprises inorganic particles.

23. The stamp construction of claim 22 wherein the inorganic particles are selected from the group consisting of silica, silicates, clays, calcium carbonate, alumina, zinc oxide, tin oxide, titanium dioxide, zinc ortho silicate and mixtures thereof.

24. The stamp construction of claim 17 wherein the release composition comprises by weight from about 10% to about 98% of the resin particles.

25. The stamp construction of claim 17 wherein the layer of ink-imprintable material (A) is paper.

26. The stamp construction of claim 17 wherein a primer is in contact with the back surface of the layer of material (A) and positioned between the back surface of the layer of material (A) and the pressure-sensitive adhesive.

27. The stamp construction of claim 26 wherein the primer is applied as an aqueous solution.

28. The stamp construction of claim 17 wherein the pressure-sensitive adhesive is applied as a hot melt, as a solution or as an emulsion.

29. The construction of claim 17 wherein the pressure-sensitive adhesive comprises a tackified styrene-isoprene-styrene rubber block copolymer hot-melt adhesive.

30. The stamp construction of claim 17 wherein the pressure-sensitive adhesive comprises an acrylic emulsion adhesive.

31. The stamp construction of claim 17 wherein the release coating is obtained from an aqueous emulsion of an addition curable vinyl silicone system comprising one or more vinyl silicone polymers, one or more silicon hydride cross-linking agents, a Group VIII metal catalyst, and emulsified or dispersed resin particles wherein the resin particles comprise a resin selected from the group consisting of polyurethanes and polyamides.

32. The stamp construction of claim 17 herein the release coating is obtained from an aqueous emulsion of a condensation curable silicone system comprising one or more hydroxysiloxane polymers, one or more silicon hydride cross-linking agents, a Group IVA catalyst and dispersed or emulsified resin particles wherein the resin particles comprise a resin selected from the group consisting of polyurethanes and polyamides.

33. An ink-imprintable stamp construction comprising a plurality of contiguous stamps in a roll configuration without an independent release liner wherein the stamps each comprise (A) a layer of ink-imprintable paper having a face surface and a back surface;

(B) an ink-imprintable silicone-release coating bonded to the face surface of the paper; said silicone-release coating comprising a blend of an addition cured or condensation cured silicone polymer component and resin particles, resin particle domains or both wherein the resin particles or resin particle domains comprise a resin selected from the group consisting of polyurethanes and polyamides;

(C) a layer of a water-soluble primer having one surface in contact with the back surface of the paper; and (D) a layer of a pressure-sensitive adhesive in contact with and bonded to the other surface of the layer of the primer whereby the stamp construction is retained in a rolled configuration by cooperation of the pressure-sensitive adhesive layer and the release coating, and the bond between the release coating and the face surface of the layer of paper is greater than the force required to separate the release coating from the pressure-sensitive adhesive as the stamp construction is unwound.

34. The stamp construction of claim 33 wherein the release coating comprises by weight from about 10% to about 70% of the cured silicone component.

35. The stamp construction of claim 33 wherein the cured silicone component comprises an addition cured silicone polymer, and the release coating comprises by weight from about 10% to about 35% of the cured silicone.

36. The stamp construction of claim 33 wherein the cured silicone component comprises a condensation cured silicone and the release coating comprises by weight from about 30% to about 70% of the cured silicone.

37. The stamp construction of claim 33 wherein the release coating (B) also comprises inorganic particles.

38. The stamp construction of claim 37 wherein the inorganic particles comprise particles selected from the group consisting of silica, silicates, clays, calcium carbonate, alumina, zinc oxide, tin oxide, titanium dioxide, zinc ortho silicate and mixtures thereof.

39. The stamp construction of claim 33 wherein the pressure-sensitive adhesive is applied as a hot-melt, or an emulsion.

40. The stamp construction of claim 33 wherein the pressure-sensitive adhesive is applied as an acrylic emulsion.

41. The construction of claim 33 wherein the pressure-sensitive adhesive comprises a tackified styrene-isoprene-styrene rubber block copolymer hot-melt adhesive.

* * * * *